Figures 1, 2:
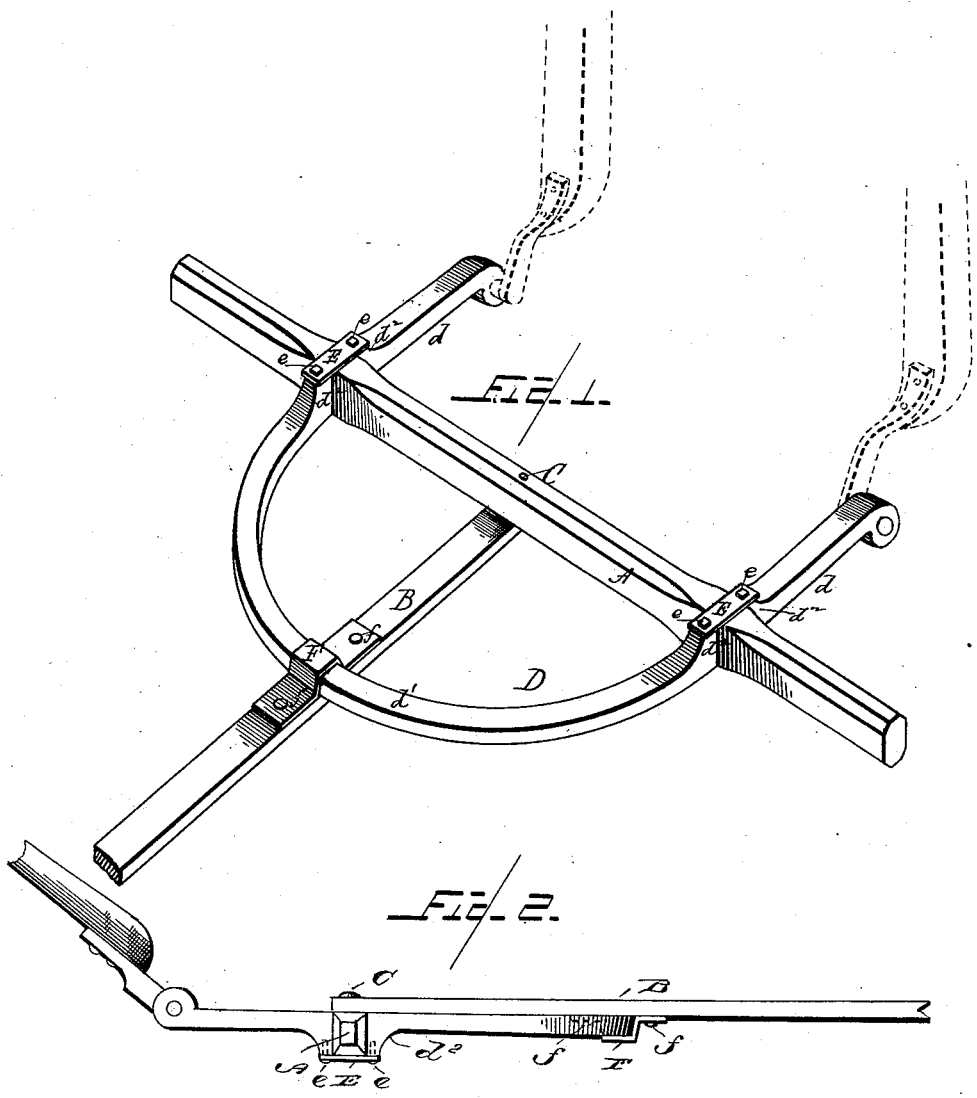

(No Model.)

F. HILDRETH.
VEHICLE RUNNING GEAR.

No. 334,439. Patented Jan. 19, 1886.

WITNESSES:
Wilb H. Powell
A. A. Connolly

INVENTOR
Francis Hildreth
By Connolly Bros
Attorneys

UNITED STATES PATENT OFFICE.

FRANCIS HILDRETH, OF TOWNSEND'S INLET, NEW JERSEY.

VEHICLE RUNNING-GEAR.

SPECIFICATION forming part of Letters Patent No. 334,439, dated January 19, 1886.

Application filed July 6, 1885. Serial No. 170,664. (No model.)

*To all whom it may concern:*

Be it known that I, FRANCIS HILDRETH, a citizen of the United States, residing at Townsend's Inlet, in the county of Cape May and State of New Jersey, have invented certain new and useful Improvements in Running-Gear for Vehicles; and I do hereby declare the following to be a full, clear, and exact description of the invention, reference being had to the accompanying drawings, which form part of this specification, in which—

Figure 1 is a perspective view of my invention in an inverted position, showing in dotted lines the manner of attaching the thills of a wagon thereto. Fig. 2 is a side elevation of Fig. 1.

My invention relates to improvements in running-gear for vehicles; and the novelty consists of the peculiar construction and combination of parts, substantially as hereinafter fully described, and specifically pointed out in the claim.

The primary object of my invention is to provide a combined hounds and slide, which shall be rigidly secured to the axle in a novel manner and loosely connected to the reach or perch, so as to be free to move under the same when the axle is turned, and which shall further subserve the function of a second coupling, to keep the front of the vehicle in position.

A further object of my invention is to provide means whereby the thills can be attached to the combined hounds and slide; and a further object is to provide means which shall be very simple, strong, and durable in construction, thoroughly effective for the purpose designed, and cheap.

Referring to the accompanying drawings, A represents the front axle of the running-gear of a wagon or similar vehicle, and B the reach or perch, secured thereto by king-bolt C in the usual manner.

D represents the combined hounds and slide, which are composed of a single piece of metal shaped so as to have two straight parallel ends, $d$ $d$, projecting forwardly of the axle A, and designed and adapted to receive or be attached to the tongue or shafts of the vehicle, as shown in dotted lines in Fig. 1 and in full lines in Fig. 2, and having an arched part, $d'$, back of the axle, which forms a slide.

The piece D is provided with four depending lugs, $d^2$, which are in pairs, as shown, and straddle the axle inside the journals of the latter. Each of said pairs of lugs has a plate, E, which connects said lugs and is fastened thereto by bolts or screws $e$ $e$. These lugs, by straddling the axle, strengthen the latter, and also operate to keep the combined hounds and slide in position on the axle, and prevent any shifting thereon.

F represents a loop or staple secured to the under side of the reach by means of bolts or screws $f$ $f$. The slide $d'$ fits between this loop and the reach, and while it has perfect liberty of movement therein longitudinally or circumferentially, it is retained constantly in sliding contact with the reach or perch, and thereby maintains the front of the vehicle in its proper position, and prevents the unseemly lurching that so constantly occurs in the ordinary class of vehicles, where there is no provision made to prevent the slide from dropping down from the reach. Said loop also subserves the purpose of a second coupling, operating as a connection between the reach and axle in case of loss or breakage of said king-bolt.

What I claim as my invention is as follows:

As an improvement in running-gear, the combination of an axle, A, a reach, B, a king-bolt, C, pivotally connecting the reach and axle, and a combined hounds and slide made in one piece of metal, and comprising an arch or bow, $d'$, integral depending lugs $d^2$, arranged in pairs and straddling the axle, the parallel arms $d$, projecting forwardly of the axle, to which the thills or draft-pole of the vehicle is connected, a plate, E, secured to each pair of lugs $d^2$ and bearing against the lower face of the axle, bolts $e$, for connecting the plates to the lugs, and a loop or staple, F, embracing the arch or bow $d'$ and bolted to the reach, all arranged and adapted to serve substantially as described.

In testimony that I claim the foregoing I have hereunto set my hand this 29th day of June, 1885.

FRANCIS HILDRETH.

Witnesses:
JOHN B. HUFFMAN,
HARRY S. DOUGLASS.